United States Patent Office 3,814,661
Patented June 4, 1974

3,814,661
PROCESS FOR BONDING FABRIC AND OTHER CARRIERS TO HIGHLY PLASTICIZED POLYVINYL CHLORIDE USING A FIRE-RETARDING ADHESIVE
Maurice W. Hart, Jr., 714 Anastia Ave., Coral Gables, Fla. 33134
Filed Dec. 23, 1971, Ser. No. 211,717
Int. Cl. B32b 27/30; C09j 5/00
U.S. Cl. 161—191                            6 Claims

ABSTRACT OF THE DISCLOSURE

This disclosure is concerned with a novel heat-releasable fire retardant-containing cold curing mastic for securing a fabric or other carrier of a highly plasticized polyvinyl chloride covering and the like to a surface that is to be weatherproofed and flame protected. In a preferred composition, an evaporation curing emulsion of latex and plasticized polyvinyl acetate is employed containing phosphate plasticizer and aluminum hydroxide or hydrate dispersed through the emulsion with from substantially 50 to 64 parts of total solids per 100 parts of liquid in the emulsion.

---

The present invention relates to a weatherproofing and fire-retarding adhesive covering and process, being primarily, though not exclusively, directed to securing and imparting fire-retarding properties to surfaces covered by fabric-carrying (or similar carrier-supported or otherwise employed) highly plasticized polyvinyl chloride layers and the like.

In copending application, Ser. No. 625,214, filed Mar. 22, 1967, for "Fabric Carried Plastic Article and Process for Forming the Same," abandoned in favor of a continuation application, Ser. No. 64,000 filed June 19, 1970, now Pat. No. 3,705,836, there is disclosed an unusually highly plasticized polyvinyl chloride composition involving plasticizer-to-polyvinyl chloride resin ratios of at least substantially 400 parts-to-100 parts and higher, useful for such purposes as decorating fabrics or other carriers to which the plastic is adhered or in which it is at least partially embedded, or providing other resilient coatings or layers that stretch, compress and otherwise deform in a unitary manner with a wide range of attached fabrics or the like. Fabric sheets as of cotton fabric, for example, may be adhered to such highly plasticized layers and used for roofing, weather stripping, gasketing and a host of other related applications. The higher plasticizer-to-resin ratios, moreover, enable cushioning or non-bottoming results to be obtained with the quivery mass, and, in the region of 1200 parts-to-100 parts or more, plasticizer oil-exuding or self-lubricating effects can be obtained, if desired. Sound, vibration and temperature insulation and isolation effects are also provided.

In such applications as a roofing fabric-carrying (or other carrier-provided) highly plasticized polyvinyl chloride layer, the requirements upon an adhesive for securing the fabric or other carrier to the roof surface or deck or the like are most stringent. First, it is desirable to have a cold adhesive that dries rapidly for ease of application. Secondly, the adhesive must bond both to the fabric or other carrier and the roof surface and must remain adhering over wide temperature ranges. Thirdly, the adhesive must not encourage migration of the plasticizer from the highly plasticized plastic contacting the same through the fabric carrying the plastic on one side and secured to the adhesive on the other. Fourthly, the composition of the adhesive and fabric-carrying plastic layer must provide fire-retarding effects sufficient not only to prevent flaming of the adhesive under fire conditions, but also to prevent the fabric from combusting or even cracking or exposing the roof surface or permitting charring of the same under fire code flame tests.

Unfortunately, commercial adhesives of a wide variety of types have proven inadequate in accomplishing all of the above objectives; and, indeed, it has been discovered that only a rather unconventional formulation of an evaporation-curing mastic applied to the fabric-carrying plastic can satisfactorily serve these ends. An object of the invention, accordingly, is to provide such a new and improved adhesive covering and process.

Polyvinyl acetate latex paints, coatings and plasticizers have heretofore been employed, as described, for example, in U.S. Letters Patent Nos. 2,720,496 and 3,092,601. These compounds have also been proposed as adhesives, as described, for example, in U.S. Letters Patent Nos. 3,202,567 and 3,305,431. In connection with such applications, it has been proposed to render these substances flame retardant, as by including a halogen-evolving plasticizer. In other types of adhesive, such as aqueous polyvinyl emulsions, organic phosphate plasticizers have been proposed, as in U.S. Letters Patent No. 3,208,093; and carbon dioxide releasing adhesives (U.S. Letters Patent No. 3,034,939) and other flameproofing compositions have also been proposed. In still other applications, hydrates have been employed to release steam as a flame retardant, as illustrated in U.S. Letters Patent No. 3,364,097.

Despite this wide knowledge of mastic compositions and fire-retarding substances, however, it has not heretofore been possible to incorporate appropriate fire-retarding materials in cold evaporation-curing emulsions, as of latex and plasticized polyvinyl acetate, in a manner that is compatible with polyvinyl chloride materials and the like. Underlying the present invention, accordingly, is the rather unexpected discovery that such compositions can be effected in a manner such that the addition of the fireproofing solids into the adhesive mastic will not destroy the film integrity and strength thereof for adhesion properties, and yet sufficient solids can be incorporated to effect substantial fire retardant effects.

A further object is to provide a novel adhesive covering of more general use, as well.

Other and further objects will be explained hereinafter and are more particularly delineated in the appended claims. In summary, however, from one of its aspects, the invention contemplates an evaporation-curing cold mastic adhesive secured to the fabric of a fabric-carrying highly plasticized polyvinyl chloride layer or the like, and containing distributed therethrough a heat-releasable fire retardant of release temperature less than the breakdown temperature of the layer. Preferred poportions and details are hereinafter set forth.

In accordance with the invention, it has been found that a cold-evaporation-curing mastic, such as latex or the like, provided with a high molecular weight filler, as of 5–10% polyvinyl acetate or the like, can be rendered adaptable to accomplish each of the four objectives above-discussed. This adaptation requires the distribution through said mastic of aluminum hydrate or hydroxide in approximately two-to-three times the above percentages of filler. To render the cured adhesive somewhat resilient and not brittle, plasticizer is also usefully added in the mastic, generally in quantity less than the aluminum hydrate, establishing also somewhat of a plasticizer equilibrium on each side of the fabric carrier that aids in preventing plasticizer migration from the plastic layer of the adhered fabric-carried plastic layer. Phosphate plasticizers are advantageous for these purposes.

Considering, further, the concept of a latex base mastic adhesive, such material has, of course, for many years been employed in this function; but always subject to the disadvantages of its flammability, its tacky and friable nature, and its low tensile strength upon water evaporation and solidification. By redissolving hardened latex in rubber solvents, however, properties have been imparted thereto which render the resulting material quite satisfactory for adhesive use in connection with shoe soles and parts and the like; but, again, the highly flammable characteristics and the tacky nature until dried have mitigated against other applications despite the improvement in tensile strength. Attempts have also been made to produce a foam of latex per se, as by casting the same with fire retardant material for such purposes as a fire retardant carpet backing; but the requirements for foaming in order to provide cushioning effects have again provided limited tensile strength.

In accordance with the present invention, accordingly, in its preferred application, the somewhat different problems of the present invention have been rather remarkably solved with a cold-evaporation-curing emulsion of latex and polyvinyl acetate (approximately 5%), imparting filming properties, and plasticizer sufficient to render the polyvinyl acetate flexible (approximately 20%). In summary, from one of its aspects, the present invention contemplates starting with a polyvinyl acetate latex of the above-described type, such as the Union Carbide UCAR 131, and modifying the same to add to 100 parts of such latex, approximately 20 parts of phosphate plasticizer, such as Monsanto Santicizer 140, about 7 parts of water to drop the total solids to the order of about 60 parts, ultimately, and about 40 parts of aluminum hydroxide or hydrate, with about two parts of a wetting agent such as "Turgitol."

It has been found that the above proportions are rather critical, in that if much below 50% of solids is present, the aluminum hydrate separates out because the latex suspension breaks. With somewhat greater than 50% of solids (preferably in the order of 50–64 parts per 100 parts of liquid in the latex emulsion), however, the hydrate will remain in suspension. With greater percentages of solids, on the other hand, a powdering effect takes place in accordance with which the substance loses its adhesive properties. More than this, in the preferred range above-mentioned, the adhesion of the emulsion has been found to be somewhat enhanced, possibly because of the slightly basic nature of the hydrate which raises the pH from the order of around 5.5 to about 7.5, though with the free acetate tending somewhat to neutralize the aluminum hydroxide.

With these rather critical proportions, the aluminum hydrate, which as later explained generates steam or water of hydration commencing with about 392° F., will not settle out of the latex suspension, and even more significantly, serves to enable the resulting emulsion to operate compatibly with polyvinyl chloride layers without extracting plasticizer therefrom and without any detectable effects of migration which would mitigate against the use of the invention for the preferred roof adhesion and other properties and applications herein discussed. Thus the polyvinyl acetate latex emulsion of the invention, provided with rather critical proportions in the preferred embodiment of phosphate plasticizer and aluminum hydroxide, has been found securely to enable adhesion of highly plasticized polyvinyl chloride and the like to a myriad of surfaces without extracting plasticizer therefrom or enabling deleterious migration or the like, while imparting fire retardant properties thereto when flamed.

With such an adhesive secured to the opposite side of the fabric or other carrier carrying the highly plasticized polyvinyl chloride layer, and adhering also to the roof surface, not only are the first three objectives above-discussed admirably met, but the fire-resisting fourth objective is rather startlingly achieved, as well.

Specifically, under conditions of Class C flame spread testing (1300°±50° F. flame under a 12 mile/hour wind for 4 minutes), it has been found that since the aluminum hydrate releases its fire-retarding water of hydration as steam vapor at about 392° F., just less than the breakdown temperature of the highly plasticized polyvinyl chloride layer, the released steam cools the fabric carrier (and the surface and the plastic itself) sufficiently to withstand such flame tests. A thin adhesive layer of a few mils thus aids in so protecting a cotton fabric carrying a $\frac{1}{16}$" polyvinyl chloride quivery layer of about 4:1 parts ratio of said plasticizer to polyvinyl chloride resin. The polyvinyl chloride layer may also be provided with at least one of aluminum hydroxide and phosphate plasticizer to improve its fire-resisting properties.

With such an adhesive, moreover, the fabric or carrier need not be either pre-mildew-proofed or fire-proofed, in view of the protecting characteristics of the adhesive.

Further modifications will also occur to those skilled in this art and all such are considered to fall within the spirit and scope of the invention as defined in the appended claims.

What is claimed is:

1. A process for adhering to a surface-to-be-weather-and-flame-protected a covering comprising a carrier coated with a highly plasticized polyvinyl chloride layer having a plasticizer-to-polyvinyl chloride resin ratio of at least substantially four-to-one, that comprises, applying an evaporation-curing cold mastic containing a high molecular weight filler to said surface and to said carrier to secure the same together, and distributing throughout said mastic prior to such application and curing a heat-releasable fire retardant comprising at least one of a phosphate plasticizer and aluminum hydroxide and of release temperature less than the breakdown temperature of said layer in order to cause the release of the fire retardant at said surface and through said carrier and layer upon the application of a flame thereto, thereby to protect from the flame, said filler and fire retardant being added in proportions only sufficient to provide substantially 50 to 64 parts of total solids per 100 parts of liquid.

2. A process as claimed in claim 1 and in which said mastic comprises latex and the said filler comprises polyvinyl acetate.

3. An adhesive covering having, in combination, a carrier-backed highly plasticized polyvinyl chloride plastic layer with a plasticizer-to-polyvinyl chloride resin ratio of at least substantially four-to-one, said plastic layer carrying a cold latex mastic layer containing a high molecular weight filler and having distributed therethrough a heat-releasable fire retardant comprising at least one of a phosphate plasticizer and aluminum hydroxide and of release temperature less than the breakdown temperature of said plastic layer, the proportions of said filler and said fire retardant being sufficient to provide substantially 50 to 64 parts of total solids per 100 parts of liquid.

4. An adhesive covering as claimed in claim 3, and in which the plastic layer is plasticized largely by a phosphate plasticizer.

5. An adhesive covering as claimed in claim 4 and in which said plastic layer further contains aluminum hydroxide.

6. An adhesive covering as claimed in claim 3 and in which said filler comprises polyvinyl acetate.

References Cited
UNITED STATES PATENTS

| | | | |
|---|---|---|---|
| 3,058,941 | 10/1962 | Birum | 161—191 X |
| 3,202,567 | 8/1965 | Muri et al. | 161—162 |
| 3,230,134 | 1/1966 | Studer | 161—62 |
| 3,515,630 | 6/1970 | Columbus et al. | 161—245 |
| 3,548,420 | 12/1970 | Spence | 3—20 |
| 3,705,836 | 12/1972 | Francis et al. | 161—94 |
| 3,719,547 | 3/1973 | Martin et al. | 161—67 |

CHARLES E. VAN HORN, Primary Examiner

R. A. DAWSON, Assistant Examiner

U.S. Cl. X.R.

156—334; 161—242, 256, 403; 260—41 B, 746, DIG. 24